(12) United States Patent
Ohgane et al.

(10) Patent No.: US 7,320,824 B2
(45) Date of Patent: Jan. 22, 2008

(54) PAINT SUBSTITUTE FILM

(75) Inventors: Hitoshi Ohgane, Saitama (JP); Keisuke Kojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 506 days.

(21) Appl. No.: 10/734,297

(22) Filed: Dec. 15, 2003

(65) Prior Publication Data

US 2004/0138368 A1   Jul. 15, 2004

(30) Foreign Application Priority Data

Dec. 16, 2002   (JP) ............................. 2002-364026

(51) Int. Cl.
*B32B 7/12* (2006.01)
*C08K 3/40* (2006.01)

(52) U.S. Cl. ..................... 428/343; 524/430; 524/494

(58) Field of Classification Search ................ 524/494, 524/430; 428/343
See application file for complete search history.

(56) References Cited

U.S. PATENT DOCUMENTS

| | | | |
|---|---|---|---|
| 4,692,481 A | | 9/1987 | Kelly |
| 4,810,540 A | | 3/1989 | Ellison et al. |
| 5,731,374 A | * | 3/1998 | Good et al. ................. 524/444 |
| RE35,970 E | * | 11/1998 | Ellison et al. ................ 428/31 |
| 5,989,696 A | * | 11/1999 | McCarthy et al. .......... 428/221 |
| 6,096,378 A | * | 8/2000 | Komatsu et al. ......... 427/407.1 |
| 6,551,432 B1 | | 4/2003 | Spain et al. |
| 6,770,360 B2 | * | 8/2004 | Mientus et al. ............. 428/354 |
| 2003/0027919 A1 | * | 2/2003 | Fritz ........................... 524/494 |
| 2004/0116645 A1 | * | 6/2004 | Huybrechts et al. .......... 528/59 |

FOREIGN PATENT DOCUMENTS

| | | |
|---|---|---|
| EP | 0 266 107 A2 | 5/1988 |
| JP | 61-85481 A | 5/1986 |
| JP | 63-120640 | 5/1988 |
| JP | 63-123469 | 5/1988 |
| JP | 2-503077 | 9/1990 |
| JP | 9-183136 | 7/1997 |
| JP | 09-183136 | 7/1997 |
| JP | 2000-085075 A | 3/2000 |
| JP | 2002-294163 A | 10/2002 |

OTHER PUBLICATIONS

WO 88/07416 published Oct. 6, 1988.

* cited by examiner

*Primary Examiner*—Tae H Yoon
(74) *Attorney, Agent, or Firm*—Arent Fox LLP

(57) ABSTRACT

A paint substitute film 1 is provided which has an excellent property that permits universal application to a variety of components, for example to a complexly shaped component, without decreasing marketability of the component due to undesirable change in color. The paint substitute film 1 includes a color coat 3 which contains metallic pigments 5 and orientation inhibitors 6 for inhibiting orientation of the metallic pigments 5. When the paint substitute film 1 is bonded onto an exterior component of an automobile or the like, the paint substitute film 1 is drawn, but the orientation inhibitors 6 each serve as an obstacle to prevent the metallic pigments 5 from being uniformly oriented toward a direction parallel to the drawing direction. Accordingly, even after the paint substitute film 1 is drawn, rays of light incident on the film 1 diffuses upon reflection off the metallic pigments 5, and thus unfavorable alteration of color in the film 1 can be prevented.

3 Claims, 5 Drawing Sheets

PAINT SUBSTITUTE FILM

BACKGROUND OF THE INVENTION

This invention relates to a paint substitute film used as substitutes for painting of exterior panels or components of an automobile or the like.

In order to improve an ornamental design of exterior components or trims, such as fenders, bumpers, hoods, wheel caps, and other plastic components, of a vehicle, spray paint is employed in most instances. However, a painting process including an operation of spraying paint requires a large facility and wide space for repeatedly performed painting and drying steps and would reduce productivity; therefore, in recent years, the use of ornamental film (hereinafter referred to as "paint substitute film") for improving an outer appearance of a finished product has been receiving attention as serving to streamline a finishing process for the product.

A paint substitute film 101 as conventionally used, for example as shown in FIG. 4A, includes a clear coat 102, a color coat 103, and an adhesive layer 104 which are laminated one after another.

The clear coat 102 is formed using a high-transparency plastic material composed for example of polyurethane, acrylic resins, polyester resins, silicon resins, polyvinylidene fluoride (PVDF) or mixtures thereof, and serves to protect and gloss over the color coat 103, and to exert other advantageous effects. The color coat 103 is formed with metallic pigments 105 added to resinous materials having substantially the same composition as of the clear coat 102, and serves to produce a metallike effect similar to spray paint in appearance. The adhesive layer 104 serves to bond the paint substitute film 101 onto a surface of an exterior component or the like of an automobile.

When the paint substitute film 101 is bonded to the exterior component or the like, the paint substitute film 101 heated in advance under infrared irradiation from an infrared lamp or the like is formed into a shape conforming to a surface of the exterior component by an in-mold process, a vacuum forming or the like, and bonded to the exterior component using the adhesive layer 104. Upon bonding the paint substitute film 101 to the exterior component, the paint substitute film 101 is drawn so as to conform to a mold or a contoured surface of the exterior component (see FIG. 4B), while retaining a layered structure thereof as illustrated in FIG. 4A.

As shown in FIG. 4A, the metallic pigments 105 each shaped like a staple fiber or a flake are dispersed in the color coat 103 of the paint substitute film 101 in a manner that permits random orientations of the pigments 105. This composition allows rays of light incident from outside on the paint substitute film 101 to diffuse upon reflection off the metallic pigments 105, thereby providing a metallic-color appearance similar to that which is provided by spray paint.

However, when a metallic paint substitute film 101 is bonded to an exterior component having a complex (three-dimensional) shape among various exterior components of an automobile or the like, the film 101 is drawn to a large extent, partly, especially at a convexly curved area, so that disadvantages are entailed as below.

When the paint substitute film 101 is drawn upon application to the exterior component, the metallic pigments 105 randomly dispersed in the color coat 103 are made aligned with a direction parallel to a drawing direction (as indicated by an arrow in FIG. 4B). This phenomenon will hereinafter be referred to as "orientation" of the metallic pigments 105 (i.e., the pigments 105 are, in other words, oriented in a direction parallel to the drawing direction). Rays of light incident from outside on the paint substitute film 101 would strike on the metallic pigments 105 as thus oriented, but could not diffuse upon reflection off the pigments 105. Consequently, a desired metallic color cannot be produced, and thus the color of the paint substitute film 1 would disadvantageously be made different from its intended appearance.

FIG. 5 is a graph showing a characteristic curve of a relationship between a film drawing rate and a color difference, obtained from results of an experiment in which the color difference varying with the film drawing rate was measured for the metallic-color paint substitute film 101 and a solid-color paint substitute film. The color difference used in the experiment is a color difference index in Hunter L a b color space and is computed by the Hunter L a b color difference equation that used to prevail from the early stages of application of the color difference evaluation technology to the paint industry. It is shown in FIG. 5 that the solid-color paint substitute film undergoes little change even if the film drawing rate rises, while the metallic-color paint substitute 101 represents increase in color difference in proportion to the increase of the film drawing rate.

Accordingly, when a metallic paint substitute film 101 is bonded, in particular, to an exterior component having a complex shape among various exterior components of an automobile or the like, the film 101 is drawn to a large extent, partly, especially at a convexly curved area, and thus the largely drawn convexly curved area has an appearance different in color from surrounding areas that are not drawn so much. For that reason, the metallic-color paint substitute film 101 can be applied only to a component having a simple shape. It would conversely turn out that paint substitute films applicable to the component having a complex shape as described above could disadvantageously be restricted to solid-color paint substitute films.

The present invention has been made in view of the above-discussed circumstances.

SUMMARY OF THE INVENTION

In one aspect of the present invention, there is provided a paint substitute film comprising a color coat in which metallic pigments are dispersed, wherein the color coat includes orientation inhibitors for inhibiting orientation of the metallic pigments.

With this composition, the orientation inhibitors are interposed among the metallic pigments, to be more specific, in interstices that develop among grains of the metallic pigments, above and below the grains. Even if the film is drawn, the orientation inhibitors mixed in the color coat of the film each serve as an obstacle to inhibit the metallic pigments from becoming oriented uniformly. Accordingly, rays of light incident on the film that has been drawn can diffuse upon reflection off the metallic pigments that remain randomly oriented, so that color of the film is kept unchanged.

The above orientation inhibitors may preferably are made of at least one kind of materials selected from the group consisting of a glass bead, a glass powder and an extender. These materials may be used for the inhibitors singly or in combination, so that inhibitive action thereof can be optimized as appropriate.

The orientation inhibitors may preferably have an average particle diameter of 1 μm to 30 μm inclusive. If the average particle diameter of the orientation inhibitors falls within the range of 1 through 30 μm, the pigments can securely be prevented by the orientation inhibitors from becoming undesirably oriented upon drawing of the film. To be more specific, if the average particle diameter of the orientation inhibitors were below 1 μm, the capability of the orientation inhibitors as obstacles would decrease. On the other hand, the average particle diameter of the orientation inhibitors were over 30 μm, the orientation inhibitors would jut out of the surface of the film, whereby the outward appearance would be impaired.

Other advantages and further features of the present invention will become readily apparent from the following description of preferred embodiments with reference to accompanying drawings.

DETAILED DESCRIPTION OF THE PREFERRED EMBODIMENTS

Hereafter, a detailed description will be given of an exemplary embodiment of a paint substitute film according to the present invention with reference to FIGS. 1 through 3.

Figure 1:
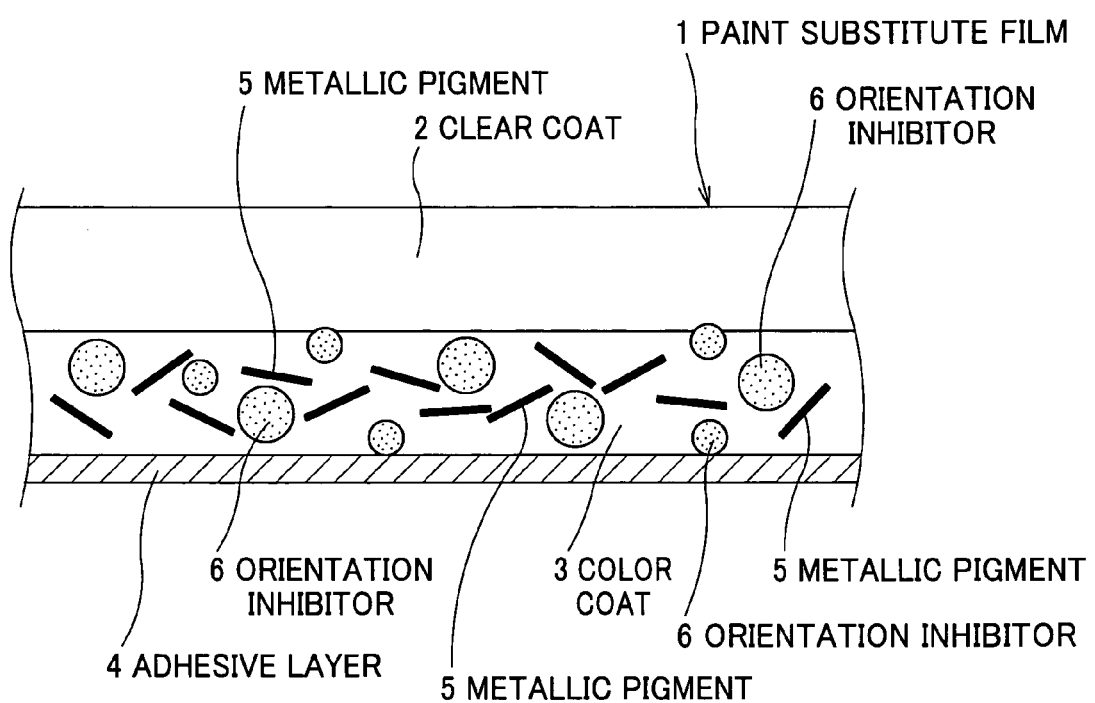
FIG. 1 is a partial magnified view in cross section of a paint substitute film according to one exemplified embodiment of the present invention.

As shown in FIG. 1, a paint substitute film according to the present embodiment has a trilaminar structure, similar to the conventional paint substitute film 101 as described above, having a clear coat 2, a color coat 3 and an adhesive layer 4 with metallic pigments 5 mixed in the color coat 3. The clear coat 2 is formed, like the conventional composition, using a high-transparency plastic material composed for example of polyurethane, acrylic resins, polyvinylidene fluoride (PVDF) or mixtures thereof. The color coat 3 is formed with substantially the same resinous materials as the clear coat 2. The clear coat 2 and color coat 3 may otherwise be formed, without using the above resinous materials, for example, using a light-curable paint, an electron beam-curable paint, a room-temperature drying paint, a lacquer, etc.

The paint substitute film 1 according to the present embodiment is different from any other conventional films in that orientation inhibitors 6 are added into the color coat 3 so as to become interposed among the metallic pigments 5, i.e., in interstices that develop among grains of the pigments 5, above and below the grains of the pigments 5.

As the orientation inhibitors 6, preferably, is used a transparent hard material that would not alter the color of the color coat 3, such as a glass bead, a glass powder and an extender, and a mixture thereof. Materials preferably usable for the extender include silica, alumina, titanium oxide, and the like.

The particle diameters of the orientation inhibitors 6 are adjustable as appropriate in accordance with the thickness of the color coat 3, the size, shape (e.g., like a staple fiber, a flake, etc.) and/or thickness of the metallic pigments 5, and preferably configured within a range of 1 μm through 30 μm. To be more specific, if the particle diameters of the orientation inhibitors 6 were below 1 μm, the capability of the orientation inhibitors 6 as obstacles to inhibit uniform orientation of the metallic pigments 5 would decrease. On the other hand, the average particle diameter of the orientation inhibitors 6 were over 30 μm, the orientation inhibitors 6 would jut out of the surface of the paint substitute film 1 upon drawing of the film 1, whereby the outward appearance would be impaired.

Moreover, the orientation inhibitors 6 may have a uniform particle diameter, but rather may preferably have some varying particle diameters within the range of 1 μm through 30 μm. Variations in particle diameter of the orientation inhibitors 6 within a specific range would serve to adequately maintain randomness in the orientations of the metallic pigments 5 as shown in FIG. 1, thus would produce a desired outward appearance more similar to that which could be achieved by the spray paint.

The paint substitute film 1 according to the present embodiment having a composition as described above exerts the following advantageous effects, which result from addition of the orientation inhibitors 6 for inhibiting orientation of the metallic pigments 5.

Figure 2A:
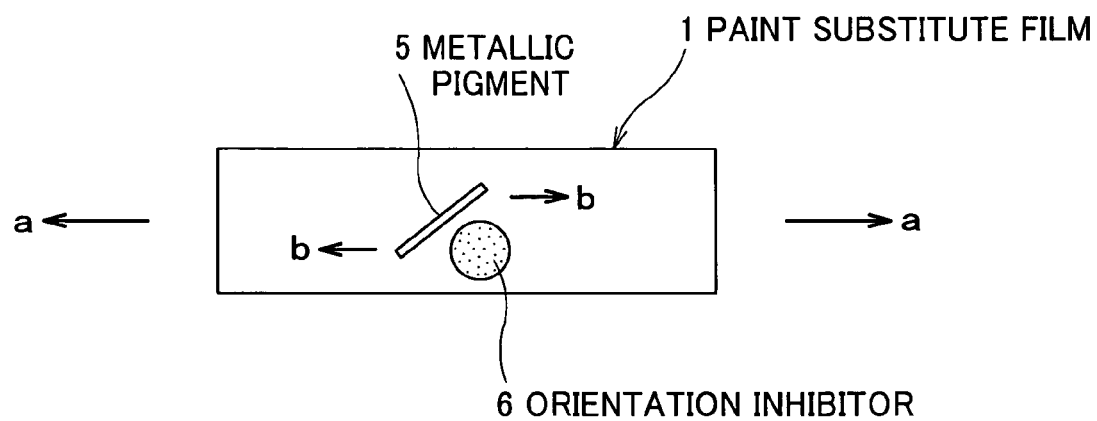
FIG. 2A is a schematic diagram showing a color coat of the paint substitute film according to the present embodiment before drawing the film.
Figure 2B:
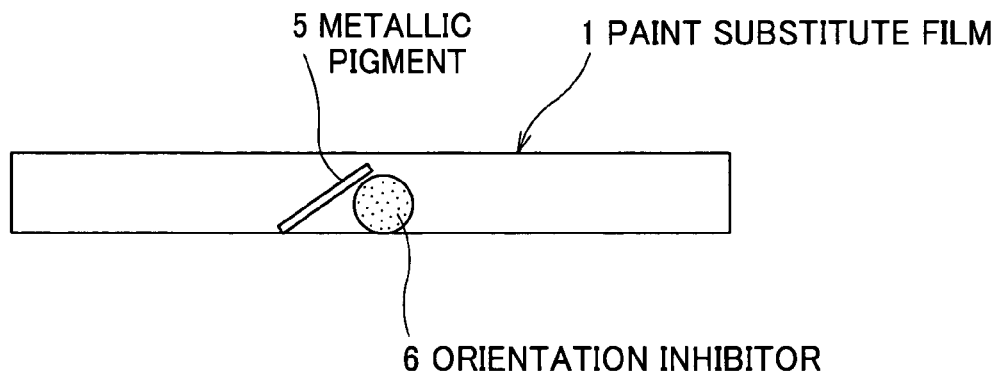
FIG. 2B is a schematic diagram showing the color coat of the paint substitute film of FIG. 2A after drawing the film.

When the paint substitute film 1 is bonded onto an exterior component (not shown) of an automobile, the paint substitute film 1 is drawn in a direction indicated by an arrow a shown in FIG. 2A. In this instance, as shown in FIG. 2B, each orientation inhibitor 6 serves as an obstacle to prevent the metallic pigment 5 from being oriented toward a direction (indicated by an arrow b in FIG. 2A) parallel to the drawing direction. Accordingly, even after the paint substitute film 1 is drawn, rays of light incident on the film 1 diffuses upon reflection off the randomly oriented metallic pigment 5, and thus unfavorable alteration of color in the film 1 can be prevented.

In order to make a comparison of a color difference versus drawing rate relationship between the paint substitute film 1 prepared according to the present embodiment and conventional films, an experiment was carried out. FIG. 3 is a graph showing a characteristic curve of a relationship between a drawing rate and a color difference obtained from the experiments for the paint substitute film 1 that contains orientation inhibitors 6 according to the present embodiment and conventional films A and B (with no orientation inhibitor added to the color coats thereof). In the experiment, the particle diameters of the orientation inhibitors 6 were configured to fall within the range of 1 μm through 30 μm as described above, and the mass ratio of the orientation inhibitors 6 to the metallic pigments 5 were set at approximately 10 mass %.

Figure 3:
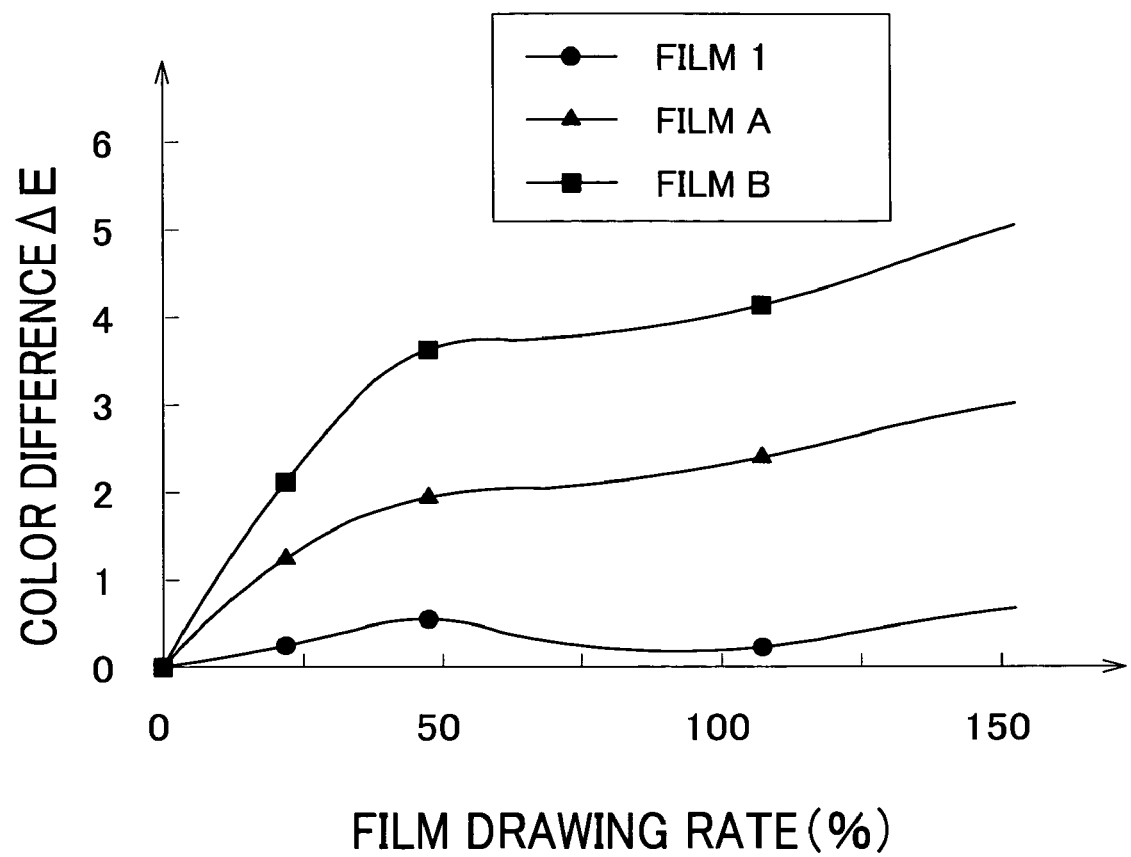
FIG. 3 is a graph showing a characteristic curve of a relationship between a drawing rate and a color difference for conventional paint substitute films and a paint substitute film according to the present embodiment.
Figure 4A:
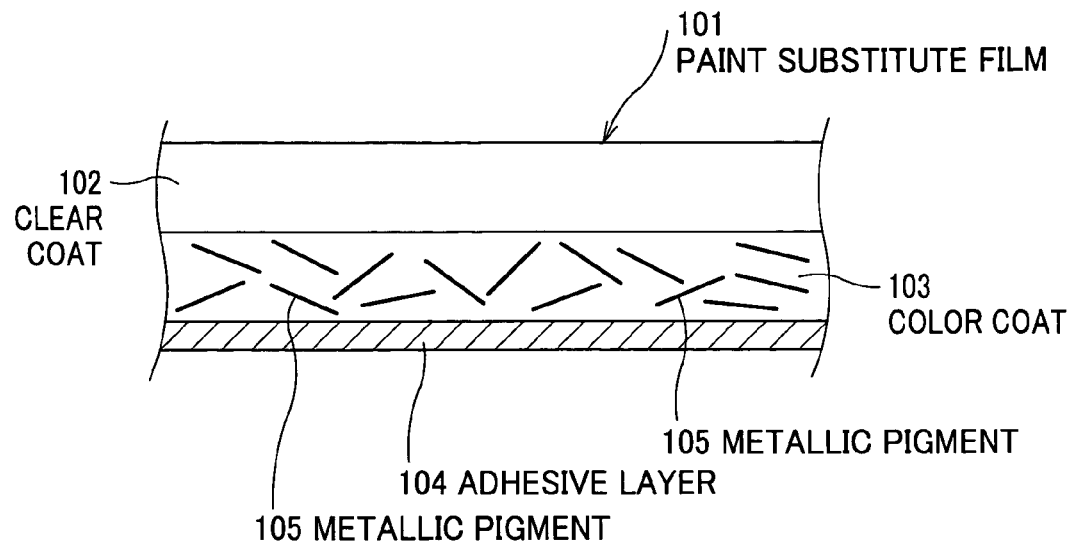
FIG. 4A is a partial magnified view in cross section of a conventional paint substitute film before drawing the film.
Figure 4B:
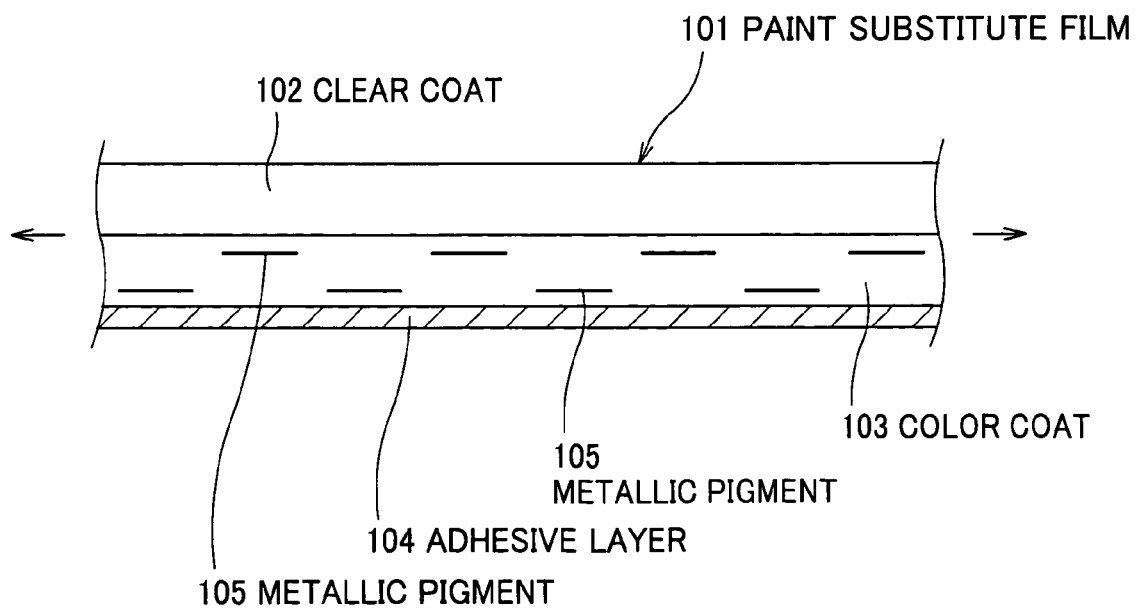
FIG. 4B is a partial magnified view in cross section of the conventional paint substitute film of FIG. 4A after drawing the film.
Figure 5:
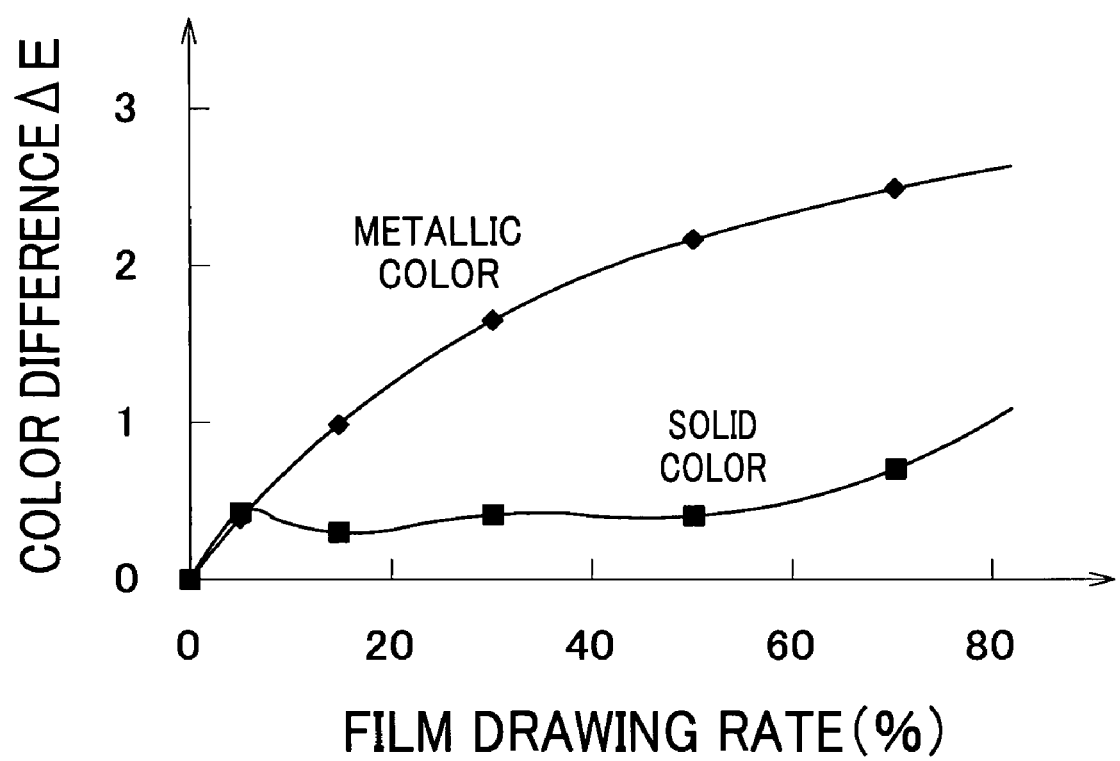
FIG. 5 is a graph showing a characteristic curve of a relationship between a drawing rate and a color difference for a conventional metallic-color paint substitute film and solid-color paint substitute film.

It has been shown as a result of the experiments that the conventional films A and B give an increase of the color difference ΔE to approximately 2-4 at a drawing rate of approximately 50-100% as shown in FIG. 3, i.e., when the conventional films A and B are drawn by approximately 1.5-2 times. In contrast, it has been shown that the film 1 according to the present embodiment can restrict the increase of the color difference ΔE to a very small value of approximately 0.5 or below even when the film 1 is drawn at a drawing rate of approximately 50-100%, and thus no significant alteration in color would take place.

Consequently, even when the metallic-color paint substitute film 1 is drawn partially to a large extent upon application to an exterior component of an automobile or the like, partial variations in the color of the paint substitute film 1 can be restricted, so that the color of the paint substitute film 1 may be rendered uniform throughout an entire surface thereof, thereby producing a metallike effect similar to spray paint in the outward appearance of the exterior component. As a result, the component to which the paint substitute film 1 is applied and other components adjacent thereto can be color-matched with ease.

In the above description of the preferred embodiment of the present invention, it is assumed that the paint substitute film 1 is applied to a component of an automobile or the like. However, the present invention is not limited thereto, but the paint substitute film 1 can be applied to vehicles other than an automobile (e.g., motorcycles, trucks, etc.), vessels (e.g., ships, motorboats, etc.), home electrical appliances, audio products, construction materials, steel sheet or plate products, and the like.

Although the preferred embodiments of the present invention have been described above, various modifications and changes may be made in the present invention without departing from the spirit and scope thereof.

In conclusion, the present invention can provide a paint substitute film having an excellent property that permits universal (unlimited) application to a variety of components, for example to a complexly shaped component, without decreasing marketability of the component due to undesirable change in color. More specifically, the present invention can provide a paint substitute film capable of preventing undesirable change or variation in color of an outward appearance of the component that might be caused by orientation (uniform orientation) of pigments therein upon drawing associated with the application of the paint substitute film to the component. Therefore, the paint substitute film according to the present invention can be provided to produce a metallike effect similar to spray paint without fail in the outward appearance of a variety of exterior components.

What is claimed is:

1. A multilayer paint substitute film consisting of a clear coat layer, a color coat layer in which metallic pigments are dispersed, and an adhesive layer, wherein the color coat layer further includes orientation inhibitors for inhibiting orientation of the metallic pigments.

2. A paint substitute film according to claim 1, wherein the orientation inhibitors are made of at least one kind of materials selected from the group consisting of a glass bead, a glass powder and an extender.

3. A paint substitute film according to claim 1, wherein the orientation inhibitors have an average particle diameter of 1 μm to 30 μm inclusive.

* * * * *